(12) United States Patent
Anspann et al.

(10) Patent No.: US 8,343,001 B2
(45) Date of Patent: Jan. 1, 2013

(54) ELECTRIC DRIVE

(75) Inventors: Stefan Anspann, Nurnberg (DE); Robert Pauli, Salzweg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 377 days.

(21) Appl. No.: 12/744,084

(22) PCT Filed: Dec. 22, 2008

(86) PCT No.: PCT/EP2008/064257
§ 371 (c)(1),
(2), (4) Date: May 21, 2010

(87) PCT Pub. No.: WO2009/074389
PCT Pub. Date: Jun. 18, 2009

(65) Prior Publication Data
US 2010/0285915 A1   Nov. 11, 2010

(30) Foreign Application Priority Data
Dec. 12, 2007   (DE) .......................... 10 2007 055 768

(51) Int. Cl.
*F16H 48/30*   (2012.01)

(52) U.S. Cl. ...................................... 475/150; 475/900
(58) Field of Classification Search ................. 475/150, 475/900
See application file for complete search history.

(56) References Cited

U.S. PATENT DOCUMENTS

| | | | |
|---|---|---|---|
| 5,637,048 A | 6/1997 | Maeda et al. | |
| 6,383,114 B1 | 5/2002 | Hoshiya et al. | |
| 6,591,705 B1 | 7/2003 | Reik et al. | |
| 7,670,564 B2 | 3/2010 | Yoshida et al. | |
| 2005/0143210 A1* | 6/2005 | Hamai et al. | 475/150 |
| 2006/0046887 A1* | 3/2006 | Bennett | 475/150 |

FOREIGN PATENT DOCUMENTS

| | | |
|---|---|---|
| DE | 32 20 149 A1 | 12/1982 |
| DE | 197 10 975 A1 | 9/1998 |
| DE | 198 59 458 A1 | 6/1999 |
| DE | 100 49 514 A1 | 7/2001 |
| DE | 10 2005 022 926 B3 | 2/2007 |
| EP | 1 562 027 A1 | 8/2005 |

* cited by examiner

*Primary Examiner* — Edwin A Young
(74) *Attorney, Agent, or Firm* — Davis & Bujold, PLLC

(57) ABSTRACT

An electric drive comprises an electric motor (2) which drives a differential transmission (14) via a spur gear stage (4) and a parking lock gear (5) is arranged on the driveshaft (1) of the electric motor (2).

6 Claims, 2 Drawing Sheets

ELECTRIC DRIVE

This application is a National Stage completion of PCT/EP2008/064257 filed Oct. 22, 2008, which claims priority from German patent application serial no. 10 2007 055 768.1 filed Dec. 12, 2007.

FIELD OF THE INVENTION

Electric drives are used in mobile vehicles as auxiliary drives for rear axles or as the only drive in the case of electrically powered vehicles.

BACKGROUND OF THE INVENTION

DE 100 49 514 B4 discloses an electric drive for a rear axle of a passenger automobile in which, via a spur gear stage, an electric drive motor powers a differential transmission whose drive output powers the wheels of the vehicle.

SUMMARY OF THE INVENTION

The purpose of the present invention is to provide an electric drive by means of which the safety of a mobile vehicle can be improved.

This objective is achieved by an electric drive of the type concerned which also has the characteristics specified in the principal claim.

The electric drive comprises an electric motor with a driveshaft which powers a differential transmission via a spur gear stage. A first spur gear is coaxially connected in a rotationally fixed manner to the driveshaft and a parking lock gear is coaxially arranged in a rotationally fixed manner relative to the first spur gear. The parking lock gear can be brought into active engagement with a parking lock pawl such that both the differential transmission and the drive motor are held in a rotationally fixed manner. Thus, when the electric drive is used, for example in a mobile vehicle, the safety of the mobile vehicle is improved since when no current is flowing, the mobile vehicle is secured against rolling away.

In another design version of the invention the first spur gear is in active connection with a second spur gear and the second spur gear is arranged in a rotationally fixed manner to and coaxially with a third spur gear, this third spur gear being in active connection with a fourth spur gear which powers the differential transmission. The electric motor and at least part of the spur gear transmission are surrounded by a housing inside which the parking lock pawl is fitted. The differential transmission can be connected to a first and to a second drive output shaft, each of which drives a wheel of the vehicle. The rotational axes of these driveshafts are preferably arranged parallel to the rotational axis of the electric motor.

In a further design form of the invention, the driveshaft of the electric motor is mounted on three bearings, with the parking lock gear and the first spur gear arranged between a first and a second bearing, and the rotor of the electric motor arranged between the second bearing and a third bearing.

In a further design form of the invention a housing wall is arranged directly outside the circumference of the parking lock gear, this wall being interrupted in the area of the parking lock pawl. The purpose of this housing wall is to prevent lubricant splashing losses.

BRIEF DESCRIPTION OF THE DRAWINGS

Other features emerge from the description of the figures, which show.

DETAILED DESCRIPTION OF THE DRAWINGS

Figure 1:
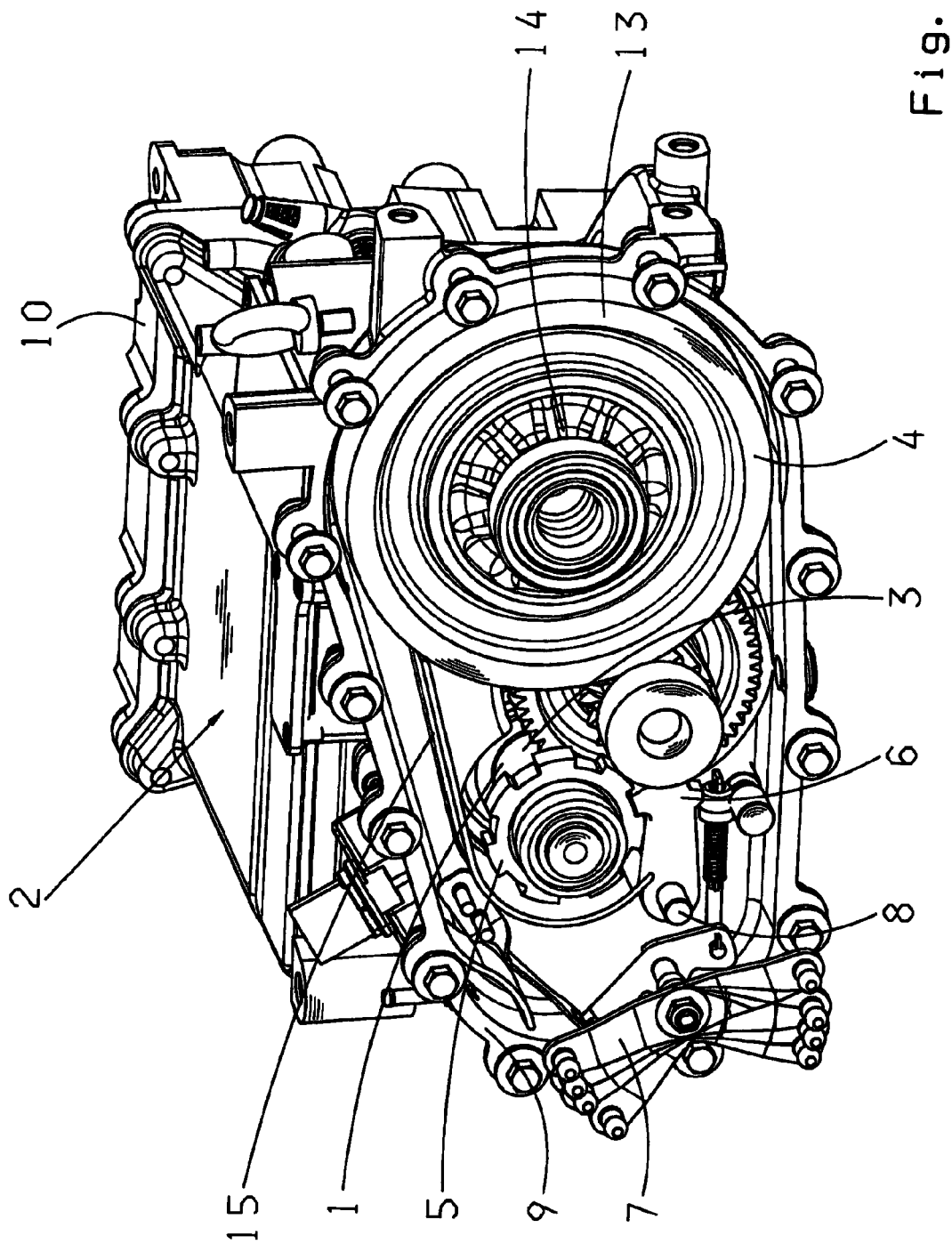
FIG. 1: A perspective view of the electric drive.
Figure 2:
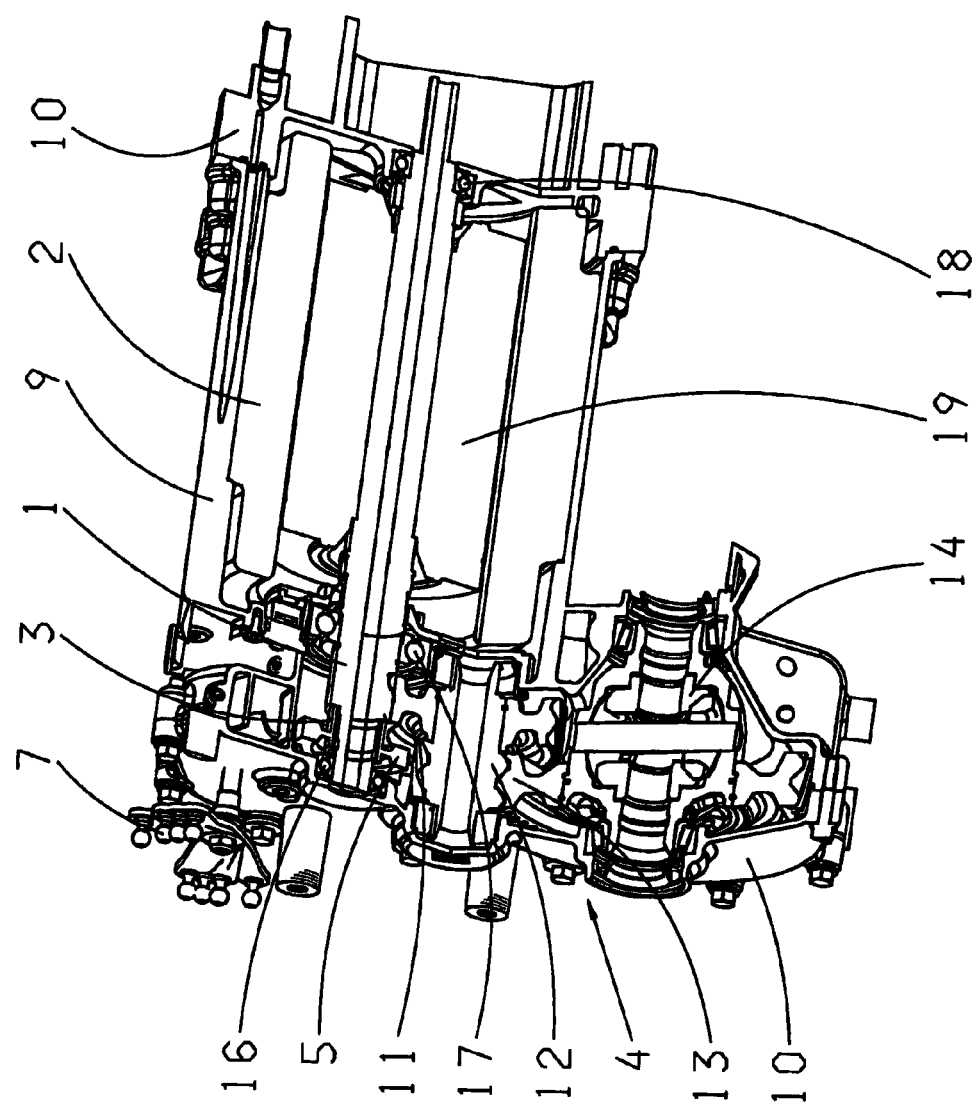
FIG. 2: A sectional view of the electric drive

FIG. 1:

A driveshaft 1 of an electric motor 2 drives a first spur gear 3 of a spur gear stage 4. The first spur gear 3 can be made integrally with the driveshaft 1. Rotationally fixed to the driveshaft 1 and close to the first spur gear 3 is arranged a parking lock gear 5. A parking lock pawl 6 can be brought into engagement with the parking lock gear 5 by means of an actuating device 7. Thereby, the driveshaft 1 is held in a rotationally fixed manner. The parking lock pawl 6 is mounted on a bolt 8 fixed in the housing 9. The housing 9 at least partially surrounds the spur gear stage 4 and the electric motor 2. On each side, the housing 9 is closed by a cover 10, although this is not shown here in the area of the spur gear stage 4. The first spur gear 3 is in active connection with a second spur gear 11, which is arranged coaxially with and rotationally fixed to a third spur gear 12. The third spur gear 12 is in active connection with a fourth spur gear 13 and this fourth spur gear 13 is connected in a rotationally fixed manner to a differential transmission 14. A housing wall 15 at least partially surrounds the parking lock gear 5 and is interrupted in the area of the parking lock pawl 6. The rotational axis of the driveshaft 1 and the rotational axis of the differential transmission 14 are parallel. This makes it possible for at least one drive output shaft of the differential transmission 14 to extend past the electric motor 2.

FIG. 2:

The driveshaft 1 is mounted on a first bearing 16, a second bearing 17 and a third bearing 18. The parking lock gear 5 and the first spur gear 3 are arranged between the first bearing 16 and the second bearing 17, and a rotor 19 of the electric motor 2 is arranged between the second bearing 17 and the third bearing 18.

INDEXES

1 Driveshaft
2 Electric motor
3 First spur gear
4 Spur gear stage
5 Parking lock gear
6 Parking lock pawl
7 Actuating device
8 Bolt
9 Housing
10 Cover
11 Second spur gear
12 Third spur gear
13 Fourth spur gear
14 Differential transmission
15 Housing wall
16 First bearing
17 Second bearing
18 Third bearing
19 Rotor

The invention claimed is:

1. An electric drive in which a driveshaft (1) of an electric motor (2) drives a differential transmission (14), via at least one spur gear stage (4), such that a first spur gear (3) of the spur gear stage (4) is arranged coaxially with the driveshaft (1), and a parking lock gear (5) is in rotationally fixed connection with the driveshaft (1) adjacent the first spur gear (3) and coaxially with the driveshaft (1);

wherein the first spur gear (3) and the parking lock gear (5) are arranged between a first bearing (16) of the driveshaft (1) and a second bearing (17) of the driveshaft (1).

2. The electric drive according to claim 1, wherein the spur gear stage (4) comprises first, second, third and fourth spur gears such that the first spur gear (3) is in active connection with the second spur gear (11), the second spur gear (11) is connected coaxially and in a rotationally fixed manner to the third spur gear (12) and the third spur gear (12) is in active connection with the fourth spur gear (13) which is connected in a rotationally fixed manner to the differential transmission (14).

3. The electric drive according to claim 1, wherein a rotor (19) of the electric motor (2) is arranged between the second bearing (17) and a third bearing (18) of the driveshaft (1).

4. The electric drive according to claim 1, wherein a parking lock pawl (6) is brought into active engagement with the parking lock gear (5), and the parking lock pawl (6) is fitted within a housing (9) that surrounds the electric motor (2).

5. The electric drive according to claim 1, wherein a housing wall (15) at least partially surrounds the parking lock gear (5) and has an interruption in an area of a parking lock pawl (6) through which the parking lock pawl (6) is brought into active engagement with the parking lock gear (5).

6. An electric drive comprising:

an electric motor (2) having a driveshaft (1) which drives a differential transmission (14) via at least one spur gear stage (4), a first spur gear (3), of the at least one spur gear stage (4), being coaxial with the driveshaft (1);

a parking lock gear (5) being connected to the driveshaft (1) in a rotationally fixed manner;

the first spur gear (3) being actively connected to a second spur gear (11) coaxially connected with and rotationally fixed to a third spur gear (12), and the third spur gear (12) being actively connected to a fourth spur gear (13) connected in a rotationally fixed manner to the differential transmission (14) such that drive is transferred from the driveshaft (1) of the electric motor (2), via the first spur gear (3), the second spur gear (11), the third spur gear (12) and the fourth spur gear (13), to the differential transmission (14);

the first spur gear (3) and the parking lock gear (5) being arranged between a first bearing (16) of the driveshaft (1) and a second bearing (17) of the driveshaft (1); and the driveshaft (1) supports the parking lock gear (5) which is lockable, via a pivotally fixed parking lock pawl (6), such that the electric motor (2) and the differential transmission (14) are each locked upon engagement of the parking lock pawl (6) with the parking lock gear (5).

\* \* \* \* \*